(12) United States Patent
Norby

(10) Patent No.: US 8,396,137 B1
(45) Date of Patent: Mar. 12, 2013

(54) REDUNDANT DATA BUS

(75) Inventor: Kevin Emil Norby, Seattle, WA (US)

(73) Assignee: The Boeing Company, Chicago, IL (US)

( * ) Notice: Subject to any disclaimer, the term of this patent is extended or adjusted under 35 U.S.C. 154(b) by 204 days.

(21) Appl. No.: 12/938,015

(22) Filed: Nov. 2, 2010

(51) Int. Cl.
*H04B 3/00* (2006.01)
*H04L 25/00* (2006.01)

(52) U.S. Cl. .................. 375/257; 710/106; 370/257

(58) Field of Classification Search ............. 375/257, 375/260; 710/106; 370/257
See application file for complete search history.

(56) References Cited

U.S. PATENT DOCUMENTS

| | | | | |
|---|---|---|---|---|
| 5,119,402 A | * | 6/1992 | Ginzburg et al. | 375/288 |
| 6,011,508 A | * | 1/2000 | Perreault et al. | 342/350 |
| 2007/0047664 A1 | * | 3/2007 | Schley-May | 375/258 |
| 2008/0320362 A1 | * | 12/2008 | Taubin et al. | 714/755 |
| 2010/0172431 A1 | * | 7/2010 | Gruenberg et al. | 375/285 |

OTHER PUBLICATIONS

FAA Regulations Part 25.1317; 14 CFR Chapter 1 (Jan. 1, 2008 Edition); Doc. No. FAA-2006-23657, 72 FR 44025, Aug. 6, 2007.
FAA Advisory Circular AC-158; "The Certification of Aircraft Electrical and Electronic Systems for Operation in the High-Intensity Radiated Fields (HIRF) Environment"; Jul. 30, 2007.
RTCA DO-160F; "Environmental Conditions and Test Procedures for Airborne Equipment"; Chapter 20; Dec. 6, 2007.
SAE Aerospace Recommended Practice ARP 5583; "Guide to Certification of Aircraft in a High Intensity Radiated Field (HIRF) Environment"; Sections 4.1, 4.2 and 5.5; Jan. 2003.

* cited by examiner

*Primary Examiner* — Curtis Odom
(74) *Attorney, Agent, or Firm* — Hope Baldauff Hartman, LLC

(57) ABSTRACT

Technologies for implementing and utilizing a redundant data bus for the reliable transmission of data between communication endpoints are provided. A redundant data bus includes two or more transmitters configured to transmit the same data signal in separate frequency bands over twisted-pair wiring to corresponding receivers. A data signal containing input data received at an input communication endpoint is generated and the data signal is simultaneously transmitted through the two or more transmitters over the twisted-pair wiring to the corresponding receivers. The data contained in the data signals received at the receivers is validated, and output data is extracted from a valid data signal and made available at an output communication endpoint, while any invalid data signals are ignored.

19 Claims, 3 Drawing Sheets

REDUNDANT DATA BUS

BACKGROUND

Data buses internal to and interconnecting avionics, navigation, and other flight-critical system components of an aircraft may be subject to substantial noise or interference during operation. Such interference may be created by both terrestrial based sources, such as television or radio transmitters, and non-terrestrial sources, such as an aircraft's radar. These data buses must be able to operate nominally in the presence of this interference. For example, U.S. Federal Aviation Regulations may require that certain electronic systems of transport aircraft be designed to withstand exposure to high-intensity radiated fields ("HIRF") without adverse effect. As defined in the regulations, HIRF threats within a broad range of frequencies and with peak field strengths of up to 3000 volts per meter in some frequency ranges must be withstood by the data buses interconnecting these electronic systems in the aircraft.

Traditionally, such data buses are protected from HIRF-level threats and other interference through the use of wire shielding encompassing the bus wiring. However, wire shielding increases the overall weight of the aircraft, thus affecting aircraft performance. The use of shielded wiring for data buses may also increase the maintenance requirements of the aircraft. For example, the integrity of the wire shielding may need to be periodically verified, further increasing maintenance costs. In addition, the wire shielding may be less effective for "in-band" interference, i.e. from interference that occurs in the operation frequency band of the data bus.

It is with respect to these and other considerations that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Methods, apparatus, and computer-readable storage media described herein provide for the implementation and use of a redundant data bus for the reliable transmission of data between communication endpoints. According to embodiments presented herein, a method for transmitting data between the communication endpoints includes receiving data at an input communication endpoint, generating a data signal containing the input data, and simultaneously transmitting the data signal through two or more transmitter/receiver pairs connected by twisted-pair wiring. Each of the transmitter/receiver pairs is configured to transmit the data signal over the twisted-pair wiring to a corresponding receiver at an associated frequency different from the frequencies associated with the other transmitters. For example, the data signal may be simultaneously transmitted in separate frequency bands through the two or more transmitter/receiver pairs. The data signals received at the receivers are validated, and the data is extracted from a valid data signal and made available at the output communication endpoint, while any invalid data signals are ignored.

According to further embodiments presented herein, a redundant data bus includes two or more transmitters configured to simultaneously transmit the same data signal in separate frequency bands over twisted-pair wiring to corresponding receivers. In various embodiments, the twisted-pair wiring consists of a single, unshielded twisted-pair wire. In various embodiments, each transmitter and its corresponding receiver are isolated from the twisted-pair wiring by matching band-pass filters tuned to the frequency band associated with the transmitter and receiver.

According to further embodiments, a computer-readable storage medium is disclosed having computer-executable instructions stored thereon that, when executed by a computing device, cause the computing device to generate a data signal containing input data according to a signaling protocol, and simultaneously transmit the data signal through a first transmitter configured to transmit the data signal over unshielded twisted-pair wire at a relatively low frequency and a second transmitter configured to transmit the data signal over the unshielded twisted-pair wire at a relatively high frequency. The data signal is received at a first receiver corresponding to the first transmitter and a second receiver corresponding to the second transmitter. The computer-readable storage medium having computer-executable instructions stored thereon that, when executed by a computing device, further causes a computing device to validate the data contained in the data signal received at the first receiver; upon determining that the data contained in the data signal received at the first receiver is valid, extract output data from the data signal received at the first receiver; upon determining that the data contained in the data signal received at the first receiver is not valid; validate the data contained in the data signal received at the second receiver; and upon determining that the data contained in the data signal received at the second receiver is valid, extract the output data from the data signal received at the second receiver.

The features, functions, and advantages that have been discussed can be achieved independently in various embodiments of the present invention or may be combined in yet other embodiments, further details of which can be seen with reference to the following description and drawings.

DETAILED DESCRIPTION

The following detailed description is directed to apparatus and methods for implementing and utilizing a redundant data bus for the reliable transmission of data between communication endpoints. Utilizing the concepts and technologies described herein, a data bus connecting communicating applications or devices within an aircraft or other environment may be implemented utilizing unshielded, twisted-pair wiring, while having increased immunity to radio frequency ("RF") noise. Multiple transmitter/receiver pairs at each end of the data bus transmit the same data signal in different frequency bands over the same twisted-pair wiring, enabled by appropriate band-pass filtering for each transmitter/receiver pair.

For example, one transmitter/receiver pair may transmit the data signal in a low-frequency range, while a second transmitter/receiver pair transmits the data stream in a high-frequency range. When an RF threat at a low-frequency level is encountered, the low-frequency signal may be interfered with, while the high-frequency signal remains unaffected. Likewise, when the RF threat is at a high-frequency, the low-frequency data stream may continue to pass valid data, delivering the desired information despite undergoing a large amplitude threat. A redundant data bus implemented with unshielded, twisted-pair wiring according to the embodiments described herein may provide immunity from HIRF-level RF noise as required by U.S. Federal Aviation Regulations, without the additional weight and increased maintenance associated with conventional wire shielding.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
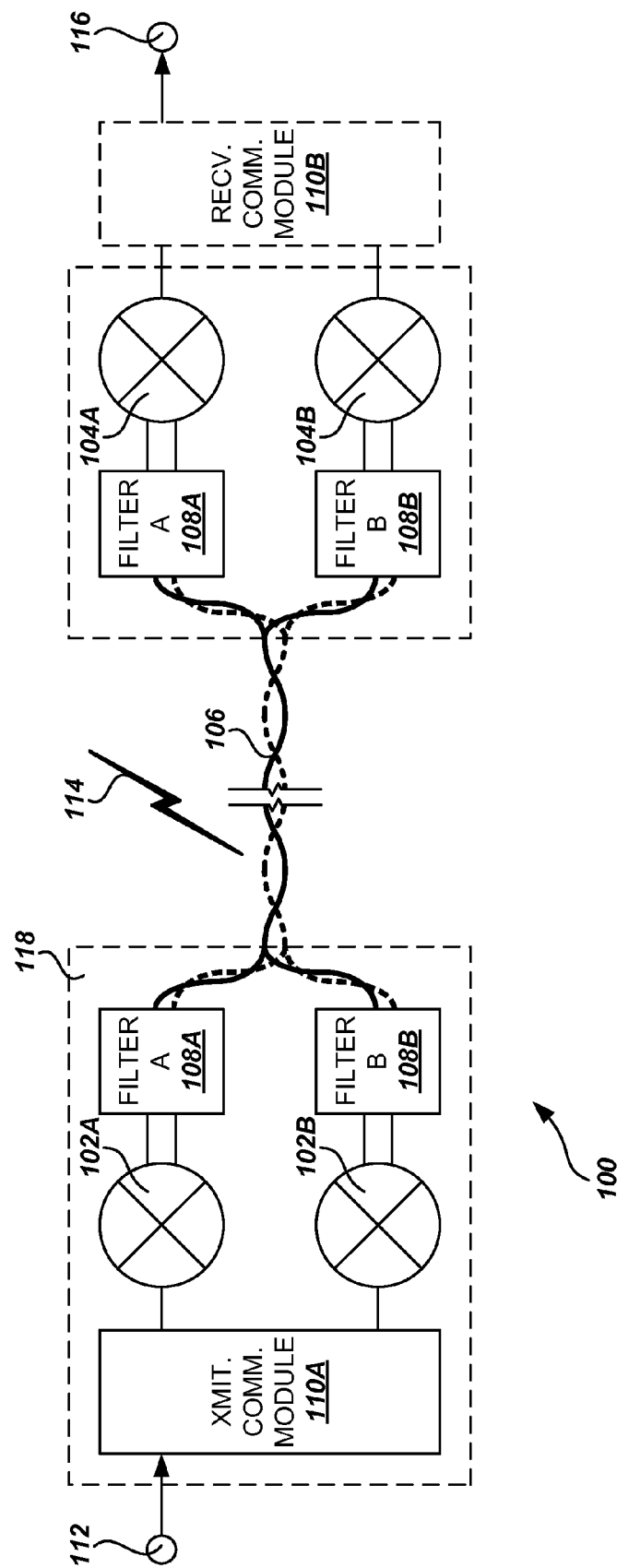
FIG. 1 is a block diagram illustrating various hardware and/or software components of a redundant data bus, according to embodiments presented herein.

FIG. 1 illustrates one example of a redundant data bus 100, according to embodiments. The redundant data bus 100 may consist of two or more transmitter/receiver pairs, such as the pair consisting of transmitter 102A and receiver 104A, and the pair consisting of transmitter 102B and receiver 104B, shown in FIG. 1. Each transmitter 102A, 102B is configured to modulate a data signal at a specific frequency, which the corresponding receiver 104A, 104B is configured to receive. All of the transmitter/receiver pairs may communicate over a single, twisted-pair wire 106 using balanced signaling. In one embodiment, the twisted-pair wire 106 is unshielded, allowing for lower weight and less maintenance at the terminal ends as compared to conventional shielded wiring.

Each transmitter/receiver pair may be isolated from the twisted-pair wire 106 by matching filters 108A, 108B. For example, transmitter 102A and receiver 104A may both be isolated from the twisted-pair wire 106 by matching filters 108A. The filters 108A, 108B may be band-pass filters that pass the range of frequencies used in the transmission of the data signal between the corresponding transmitter 102A, 102B and receiver 104A, 104B, while rejecting or attenuating frequencies outside that range. The range of frequencies around the center frequency of the transmitter 102A, 102B passed by the filters 108A, 108B may be based on the bandwidth requirements of the data signal. For example, the filters 108A, 108B may be passive LC filters tuned to the respective modulation frequencies of the corresponding transmitter/receiver pair.

According to one embodiment, a redundant data bus 100 comprises a first transmitter 102A and receiver 104A pair configured to transmit a data signal modulated at a first frequency, and a second transmitter 102B and receiver 104B pair configured to transmit the data signal modulated at a second frequency. The second frequency may be substantially higher than the first frequency. For example, the first transmitter 102A and receiver 104A pair may be configured to transmit a data signal modulated at a relatively low-frequency, such as 100 kHz, and the second transmitter 102B and receiver 104B pair may be configured to transmit the data signal modulated at a relatively high-frequency, such as 1 GHz. The band-pass filter 108A corresponding to the low-frequency transmitter/receiver pair may be configured to pass frequencies in a range of ±10 kHz around the center frequency of 100 kHz, while the band-pass filter 108B corresponding to the high-frequency transmitter/receiver pair may be configured to pass frequencies in a range off 10 kHz around the center frequency of 1 GHz. These described frequencies are merely exemplary and should not limit the scope of the disclosed embodiments. It will be appreciated that the modulation frequencies selected for each of the transmitter/receiver pairs may vary based on the communication requirements of the avionics systems or applications communicating over the redundant data bus 100 and the frequency range of the RF noise encountered. It will be further appreciated that the separation of the various modulation frequencies should be sufficient such that a HIRF-level threat in one RF frequency range that interferes with the data signal transmitted between one transmitter/receiver pair leaves the data signal transmitted between the other transmitter/receiver pairs relatively unaffected. Various embodiments of the disclosure envision protecting against HIRF-level threats including frequencies ranging from 10 kHz to 40 GHz.

A transmitting communication module 110A may be coupled to the transmitters 102A, 102B of the redundant data bus 100. The transmitting communication module 110A may receive data from an avionics device, sensor, control, or other application module or component at an input communication endpoint 112. The transmitting communication module 110A then generates a data signal containing the input data based on a signaling protocol. For example, the transmitting communication module 110A may generate a signal compliant with the ARINC™ 429 specification from ARINC, Incorporated of Annapolis, Md. The generated data signal may contain communication overhead in addition to the input data according to the selected signaling protocol, including data validation information, such as a checksum or parity indicators; source and destination addresses; data type information; and the like.

The transmitting communication module 110A provides the generated data signal to the transmitters 102A, 102B of the data bus simultaneously. Each transmitter 102A, 102B modulates the data signal around the associated modulation frequency and transmits the data signal across the twisted-pair wire 106 to the corresponding receiver 104A, 104B through the corresponding filters 108A, 108B at each end. The transmitted data signals are received over the twisted-pair wire 106 by the corresponding receivers 104A, 104B and provided to a counterpart receiving communication module 110B.

The receiving communication module 110B may then validate the data encoded within the data signals received by each of the receivers 104A, 104B. For example, the receiving communication module 110B may compare the data contained in the data signals received from each receiver 104A, 104B to determine if the data is the same. If the data differs, then the receiving communication module 110B may independently validate the data contained in each data signal received from each receiver 104A, 104B. For example, the communication module 110B may utilize data validation information encoded in the data signal, such as a checksum or parity indicator, to determine the validity of the data contained in each data signal.

It will be appreciated that, because the redundant data bus 100 transmits the same data signal over the twisted-pair wire 106 at different frequencies, a high-intensity burst of RF interference in a particular frequency band may disrupt the signal between one transmitter/receiver pair, while having little or no impact on the signal between other transmitter/receiver pairs. For example, in the double redundant data bus 100 illustrated in FIG. 1, RF interference around the 1 GHz band, shown at 114, may disrupt the data signal transmitted at 1 GHz from the transmitter 102B to the receiver 104B, while the data signal transmitted at 100 kHz from the transmitter 102A to the receiver 104A remains unaffected.

The receiving communication module 110B may detect the disrupted data signal received at the receiver 104B by determining that the data contained within the data signal does not match the checksum or parity indicator encoded in the signal, for example. The receiving communication module 110B may then extract the data from the valid data signal received at the unaffected receiver 104A, while ignoring the invalid data signal(s) received from other receivers, such as receiver 104B. The receiving communication module 110B may then make the valid data available at an output communication endpoint 116 to be used by a receiving avionics device or other application.

In one embodiment, the redundant data bus 100 provides one-way communication between a transmitting communication module 110A and the associated two or more transmitters 102A, 102B and any number of receiving communication modules 110B and their corresponding receivers 104A, 104B. In another embodiment, the redundant data bus 100 may provide for two-way connectivity between any number of transmitting communication modules 110A and receiving communication modules 110B (referred to herein generally as communication modules 110), with each of the communication modules 110 capable of both transmitting and receiving data signals from multiple pairs of transceivers connected to the twisted-pair wire 106. In a further embodiment, the redundant data bus 100 may include multiple twisted-pair wires 106, each connecting one or more of the transmitter/receiver or transceiver pairs.

The communication modules 110 may be implemented in hardware or software. In one embodiment, the communication module 110 is integrated with the transmitters 102A, 102B or receivers 104A, 104B and the filters 108A, 108B in a single, integrated circuit 118, as shown FIG. 1. In an alternative embodiment, the transmitters 102A, 102B or receivers 104A, 104B may be implemented in hardware, while the communication module 110 is implemented in software, as part of a transmitting and/or receiving application executing in an avionics device or other computing system, for example. It will be appreciated that any combination of hardware and software known in the art may be utilized to implement the transmitters 102A, 102B, receivers 104A, 104B, filters 108A, 108B, and communication modules 110 in the redundant data bus 100, according to the embodiments described herein.

Figure 2:
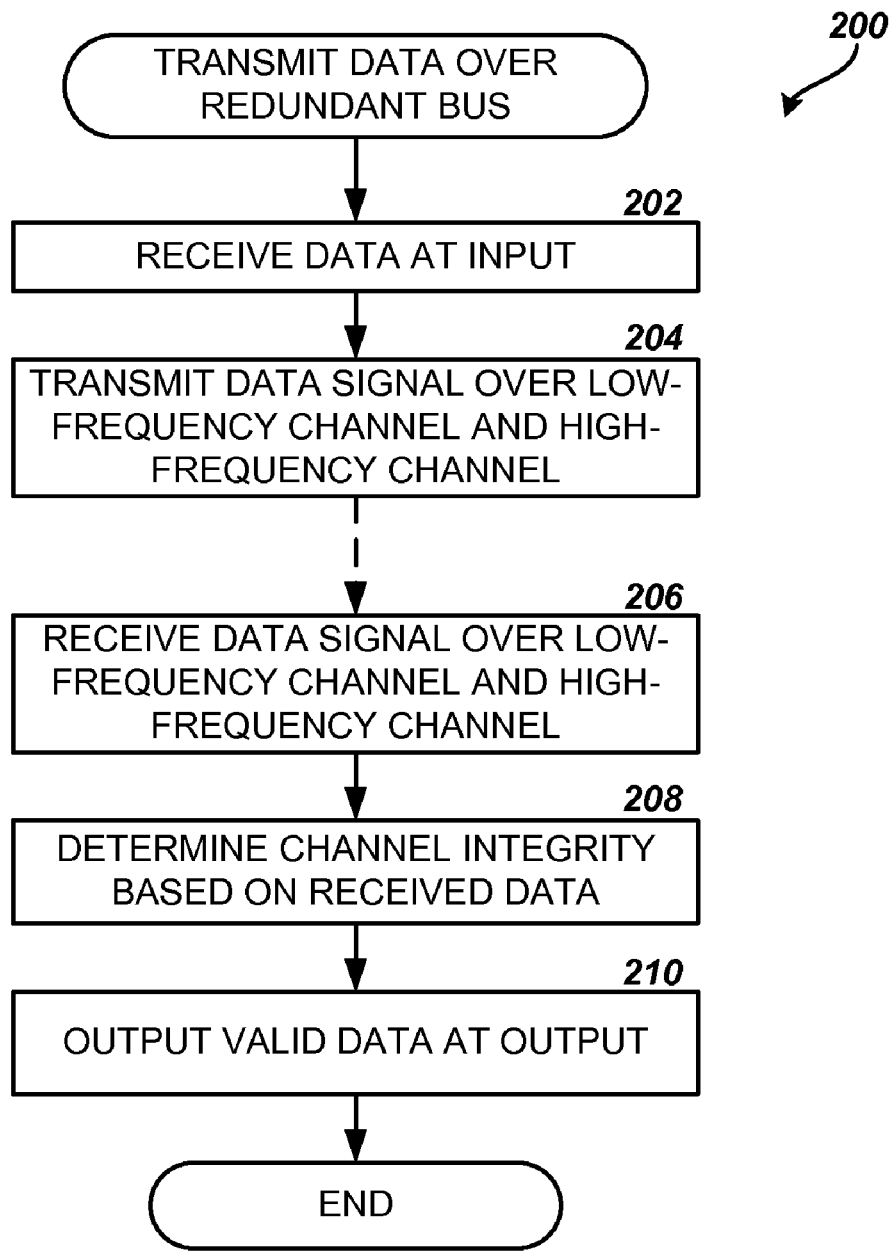
FIG. 2 is a flow diagram showing one method for transmitting data over a redundant data bus between two communication endpoints, according to embodiments described herein.

As described above, the redundant data bus 100 allows the transmission of a data signal over an unshielded, twisted-pair wire, thus saving weight and maintenance costs over the use of conventional shielded cable. FIG. 2 shows one routine 200 for transmitting data over a double redundant data bus 100 consisting of a low-frequency transmitter/receiver pair and a high-frequency transmitter/receiver pair connected by a single twisted-pair wire 106, as described above in regard to FIG. 1. It should be appreciated that more or fewer operations may be performed than shown in FIG. 2 and described below, and that the operations may be performed in a different order than that described herein.

The routine 200 begins at operation 202, where the transmitting communication module 110A receives data at the input communication endpoint 112. The transmitting communication module 110A may receive the input data from an application or avionics component of an aircraft, for example. From operation 202, the routine proceeds to operation 204, where the transmitting communication module 110A generates a data signal containing the input data based on a selected signaling protocol and simultaneously transmits the data signal through the low-frequency transmitter 102A and high-frequency transmitter 102B over the twisted-pair wire 106.

According to one embodiment, the transmitted data signals from the transmitters 102A, 102B are filtered through corresponding band-pass filters 108A, 108B before being placed on the twisted-pair wire 106.

The routine 200 proceeds from operation 204 to operation 206, where the transmitted data signals are received by the corresponding low-frequency receiver 104A and high-frequency receiver 104B. The signals may be passed from the twisted-pair wire 106 through matching band-pass filters 108A, 108B to the receivers 104A, 104B, as described above in regard to FIG. 1.

From operation 206, the routine 200 proceeds to operation 208, where the receiving communication module 110B receives the data signal from the receivers 104A, 104B and determines the validity of the data encoded in the signals. For example, the receiving communication module 110B may compare the data contained in the data signals received from each receiver 104A, 104B to determine if the data is the same, as described above in regard to FIG. 1. If the data differs, then the receiving communication module 110B may independently validate the data contained in each data signal received from each receiver 104A, 104B from data validation information encoded in the data signal, such as a checksum or parity indicator. For example, the receiving communication module 110B may detect a disrupted data signal received at a receiver 104A, 104B by determining that the data contained within the data signal does not match a checksum or parity indicator encoded in the signal.

The routine 200 proceeds from operation 208 to operation 210, where the receiving communication module 110B extracts the data from the valid data signal received at one of the receivers 104A, 104B, while ignoring the invalid data signal(s) received from other receivers. The receiving communication module 110B then makes the valid data available at the output communication endpoint 116 to be used by a receiving avionics device or other application. From operation 210, the routine 200 ends.

Figure 3:
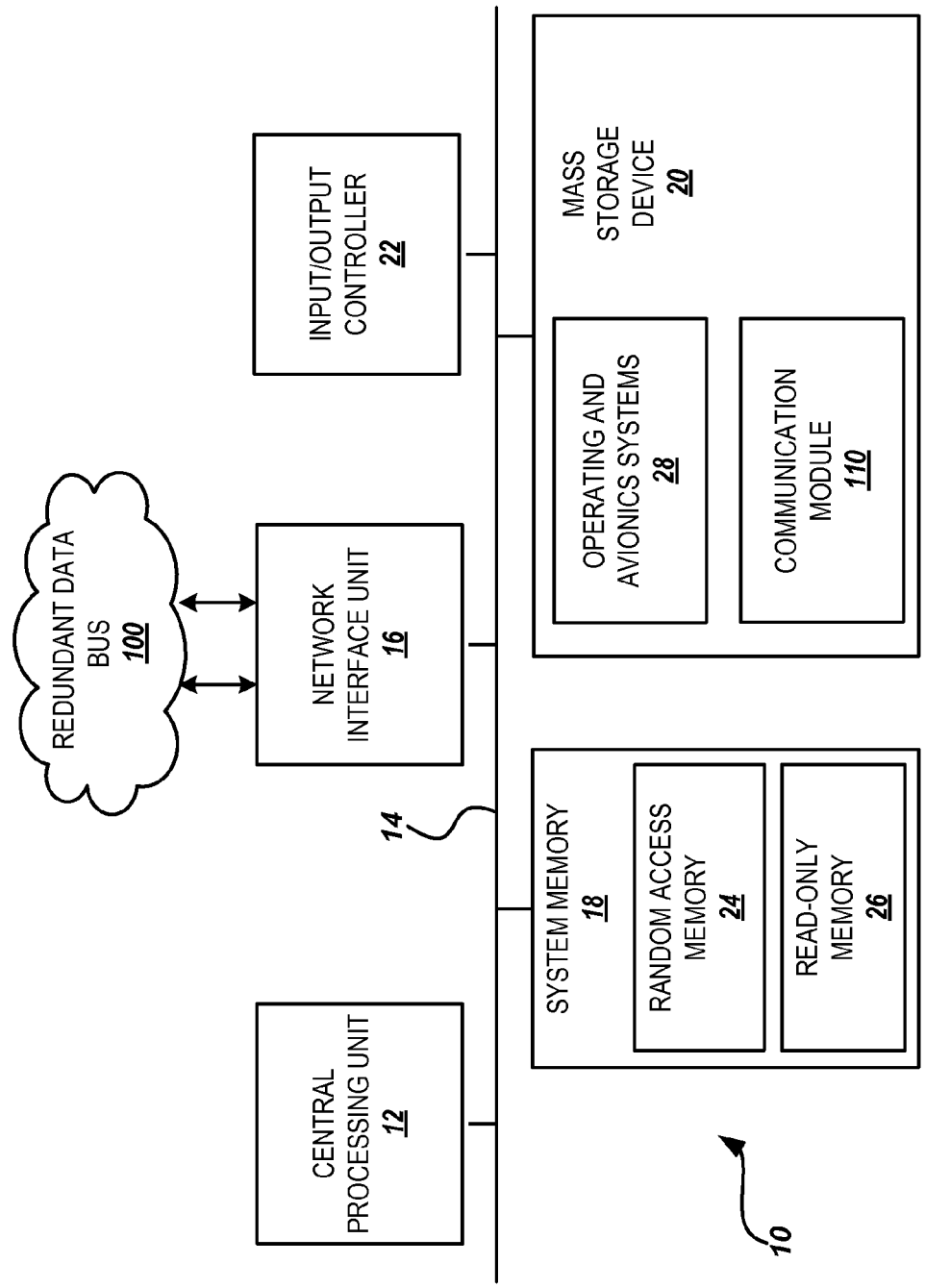
FIG. 3 is a block diagram showing an illustrative computer hardware and software architecture for a computing system capable of implementing aspects of the embodiments presented herein.

FIG. 3 shows an illustrative computer architecture 10 capable of executing the software components described herein for implementing and utilizing a redundant data bus for the reliable transmission of data between communication endpoints, in the manner presented above. For example, the computer architecture 10 may execute the communication modules 110 described above in addition to or in conjunction with the transmitting and receiving applications. The computer architecture 10 may be embodied in single computing device or in a combination of one or more processing units, storage units, and/or other computing devices implemented in the avionics systems of an aircraft or other computing system. The computer architecture 10 includes one or more central processing units 12 ("CPUs"), a system memory 18, including a random access memory 24 ("RAM") and a read-only memory 26 ("ROM"), and a system bus 14 that couples the memory to the CPUs 12.

The CPUs 12 may be standard programmable processors that perform arithmetic and logical operations necessary for the operation of the computer architecture 10. The CPUs 12 may perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates.

These basic switching elements may be combined to create more complex logic circuits, including registers, adders-subtractors, arithmetic logic units, floating-point units, and the like.

The computer architecture 10 also includes a mass storage device 20. The mass storage device 20 may be connected to the CPUs 12 through a mass storage controller (not shown) further connected to the bus 14. The mass storage device 20 and its associated computer-readable media provide non-volatile, non-transitory storage for the computer architecture 10. The mass storage device 20 may store an operating system or other avionics systems 28, as well as specific application modules or other program modules or components, such as the communication modules 110 described above in regard to FIG. 1. The mass storage device 20 may also store data collected or utilized by the various systems, modules, and components.

The computer architecture 10 may store programs and data on the mass storage device 20 by transforming the physical state of the mass storage device to reflect the information being stored. The specific transformation of physical state may depend on various factors, in different implementations of this disclosure. Examples of such factors may include, but are not limited to, the technology used to implement the mass storage device 20, whether the mass storage device is characterized as primary or secondary storage, and the like. For example, the computer architecture 10 may store information to the mass storage device 20 by issuing instructions through the storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope of the present description, with the foregoing examples provided only to facilitate this description. The computer architecture 10 may further read information from the mass storage device 20 by detecting the physical states or characteristics of one or more particular locations within the mass storage device.

Although the description of computer-readable media contained herein refers to a mass storage device, such as a hard disk or CD-ROM drive, it should be appreciated by those skilled in the art that computer-readable media can be any available computer storage media that can be accessed by the computer architecture 10. By way of example, and not limitation, computer-readable media may include volatile and non-volatile, removable and non-removable media implemented in any method or technology for the non-transitory storage of information, such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information in a non-transitory fashion and which can be accessed by the computer architecture 10. According to one embodiment, the computer architecture 10 may have access to computer-readable media storing computer-executable instructions that, when executed by the computer, perform the routine 200 for transmitting data over a redundant data bus, as described above in regard to FIG. 2 and in the various embodiments disclosed herein.

According to various embodiments, the computer architecture 10 may operate in a networked environment using connections to other avionics systems, sensors, controls, and devices in the aircraft through a network, such as the redundant data bus 100 described herein. The computer architecture 10 may connect to the redundant data bus 100 through a network interface unit 16 connected to the bus 14. It should be appreciated that the network interface unit 16 may also be utilized to connect to other types of networks and remote computer systems. The computer architecture 10 may also include an input-output controller 22 for providing output to aircraft terminals and displays; controls, sensors, and devices in the aircraft; a computer monitor; a printer; or other type of output device. The input-output controller 22 may further receive input from the controls, sensors, and devices in the aircraft; a control panel in the aircraft, such as an MCDU or EFIS control panel; a keyboard; a mouse, an electronic stylus; a touch screen; and the like.

Based on the foregoing, it should be appreciated that technologies for implementing and utilizing a redundant data bus for the reliable transmission of data between communication endpoints are provided herein. The subject matter described above is provided by way of illustration only and should not be construed as limiting. Various modifications and changes may be made to the subject matter described herein without following the example embodiments and applications illustrated and described, and without departing from the scope of the present disclosure, which is set forth in the following claims.

What is claimed is:

1. A method for transmitting data, the method comprising:
generating a data signal containing input data according to a signaling protocol;
simultaneously transmitting the data signal through a first transmitter configured to transmit the data signal over unshielded twisted-pair wire at a first frequency and a second transmitter configured to transmit the data signal over the unshielded twisted-pair wire at a second frequency, the second frequency being higher than the first frequency;
receiving the data signal at a first receiver corresponding to the first transmitter and a second receiver corresponding to the second transmitter;
validating the data contained in the data signal received at the first receiver;
upon determining that the data contained in the data signal received at the first receiver is valid, extracting output data from the data signal received at the first receiver;
upon determining that the data contained in the data signal received at the first receiver is not valid, validating the data contained in the data signal received at the second receiver; and
upon determining that the data contained in the data signal received at the second receiver is valid, extracting the output data from the data signal received at the second receiver.

2. The method of claim 1, wherein validating the data contained in the data signal comprises comparing the data contained in the data signal received at the first receiver and the data contained in the data signal received at the second receiver to determine if the data contained in the data signals is the same.

3. The method of claim 1, wherein validating the data contained in the data signal comprises determining the validity of the data contained in the data signal based on validation information encoded in the data signal according to the signaling protocol.

4. The method of claim 1, wherein the first transmitter and the first receiver are isolated from the unshielded twisted-pair wire by matching band-pass filters configured to pass a range of frequencies around the first frequency, and wherein the second transmitter and second receiver are isolated from the unshielded twisted-pair wire by matching band-pass filters configured to pass a range of frequencies around the second frequency.

5. The method of claim 4, wherein the matching band-pass filters comprise passive LC filters.

6. A redundant data bus comprising:
   a plurality of transmitters, each of the plurality of transmitters configured to transmit a data signal at an associated frequency;
   a plurality of receivers, each of the plurality of receivers corresponding to one of the plurality of transmitters and configured to receive the data signal from the corresponding transmitter at the associated frequency; and
   twisted-pair wiring connecting each of the plurality of transmitters with the corresponding receiver,
   wherein the redundant data bus is configured to simultaneously transmit the same data signal from each of the plurality of transmitters to the corresponding receiver over the twisted pair wiring,
   wherein the frequency associated with each of the plurality of transmitters is different from the frequencies associated with the other transmitters,
   wherein the redundant data bus is configured to validate the data contained in the data signal received at a first receiver of the plurality of receivers;
   wherein the redundant data bus is configured to, upon determining that the data contained in the data signal received at the first receiver of the plurality of receivers is valid, extract output data from the data signal received at the first receiver of the plurality of receivers;
   wherein the redundant data bus is configured to, upon determining that the data contained in the data signal received at the first receiver of the plurality of receivers is not valid, validate the data contained in the data signal received at a second receiver of the plurality of receivers; and
   wherein the redundant data bus is configured to, upon determining that the data contained in the data signal received at the second receiver of the plurality of receivers is valid, extract the output data from the data signal received at the second receiver of the plurality of receivers.

7. The redundant data bus of claim 6, wherein a first transmitter of the plurality of transmitters is configured to transmit the data signal at a first associated frequency and a second transmitter of the plurality of transmitters is configured to transmit the data signal at a second associated frequency, wherein the second associated frequency is higher than the first associated frequency.

8. The redundant data bus of claim 6, wherein the twisted-pair wiring comprises a single twisted-pair wire.

9. The redundant data bus of claim 6, wherein the twisted-pair wiring is unshielded.

10. The redundant data bus of claim 6, wherein each of the plurality of transmitters and corresponding receivers is isolated from the twisted-pair wiring by matching band-pass filters configured to pass a range of frequencies around a center frequency comprising the frequency associated with the transmitter.

11. The redundant data bus of claim 10, wherein the matching band-pass filters comprise passive LC filters.

12. The redundant data bus of claim 10, wherein the plurality of transmitters and the matching band-pass filters are integrated into a single integrated circuit.

13. The redundant data bus of claim 6, further comprising:
   a transmitting communication module configured to receive data, generate a data signal containing the data, and simultaneously transmit the data signal over the redundant data bus through each of the plurality of transmitters; and
   a receiving communication module configured to receive the data signal from each of the plurality of receivers, validate the data contained in the data signal received from each of the plurality of receivers, extract the data from a valid data signal, and output the data.

14. The redundant data bus of claim 13, wherein the receiving communication module validates the data contained in the data signal based upon validation information encoded in the data signal.

15. A computer-readable storage medium having computer-executable instructions stored thereon that, when executed by a computing device, cause the computing device to:
   generate a data signal containing input data according to a signaling protocol;
   simultaneously transmit the data signal through a first transmitter configured to transmit the data signal over unshielded twisted-pair wire at a first frequency and a second transmitter configured to transmit the data signal over the unshielded twisted-pair wire at a second frequency, the second frequency being higher than the first frequency;
   receive the data signal at a first receiver corresponding to the first transmitter and a second receiver corresponding to the second transmitter;
   validate the data contained in the data signal received at the first receiver;
   upon determining that the data contained in the data signal received at the first receiver is valid, extract output data from the data signal received at the first receiver;
   upon determining that the data contained in the data signal received at the first receiver is not valid, validate the data contained in the data signal received at the second receiver; and
   upon determining that the data contained in the data signal received at the second receiver is valid, extract the output data from the data signal received at the second receiver.

16. The computer-readable storage medium of claim 15, wherein validating the data contained in the data signal comprises comparing the data contained in the data signal received at the first receiver and the data contained in the data signal received at the second receiver to determine if the data contained in the data signals is the same.

17. The computer-readable storage medium of claim 15, wherein validating the data contained in the data signal comprises determining the validity of the data contained in the data signal based on validation information encoded in the data signal according to the signaling protocol.

18. The computer-readable storage medium of claim 15, wherein the first transmitter and the first receiver are isolated from the unshielded twisted-pair wire by matching band-pass filters configured to pass a range of frequencies around the first frequency, and wherein the second transmitter and second receiver are isolated from the unshielded twisted-pair wire by matching band-pass filters configured to pass a range of frequencies around the second frequency.

19. The computer-readable storage medium of claim 18, wherein the matching band-pass filters comprise passive LC filters.

* * * * *